United States Patent
Pflug (10) Patent No.: US 10,286,855 B2
(45) Date of Patent: May 14, 2019

(54) VEHICLE VISION SYSTEM WITH VIDEO COMPRESSION

(71) Applicant: MAGNA ELECTRONICS INC., Auburn Hills, MI (US)

(72) Inventor: Goerg Pflug, Weil der Stadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 391 days.

(21) Appl. No.: 15/076,914

(22) Filed: Mar. 22, 2016

(65) Prior Publication Data
US 2016/0286216 A1 Sep. 29, 2016

Related U.S. Application Data

(60) Provisional application No. 62/136,675, filed on Mar. 23, 2015.

(51) Int. Cl.
| | | |
|---|---|---|
| *H04N 7/18* | (2006.01) | |
| *B60R 11/04* | (2006.01) | |
| *H04N 19/94* | (2014.01) | |
| *H04N 5/247* | (2006.01) | |

(52) U.S. Cl.
CPC ............. *B60R 11/04* (2013.01); *H04N 5/247* (2013.01); *H04N 7/181* (2013.01); *H04N 19/94* (2014.11); *B60R 2300/102* (2013.01); *B60R 2300/105* (2013.01); *B60R 2300/30* (2013.01)

(58) Field of Classification Search
CPC ........ H04N 19/86; H04N 19/80; H04N 19/82; H04N 19/117; H04N 19/11; H04N 19/70
See application file for complete search history.

(56) References Cited

U.S. PATENT DOCUMENTS

| | | |
|---|---|---|
| 5,289,321 A | 2/1994 | Secor |
| 5,307,136 A | 4/1994 | Saneyoshi |
| 5,309,137 A | 5/1994 | Kajiwara |
| 5,313,072 A | 5/1994 | Vachss |
| 5,336,980 A | 8/1994 | Levers |

(Continued)

FOREIGN PATENT DOCUMENTS

| | | |
|---|---|---|
| EP | 1043566 | 10/2000 |
| WO | WO2009036176 | 3/2009 |

(Continued)

OTHER PUBLICATIONS

J. Sun, Z.H. Wu, & G. Pan, "Context-aware smart car: from model to prototype", 10 J. of Zheijiang U. Sci. A 1049-1059 (2009) (Year: 2009).*

(Continued)

*Primary Examiner* — David N Werner
(74) *Attorney, Agent, or Firm* — Honigman LLP (57) ABSTRACT

A multi-camera vision system of a vehicle includes at least four cameras disposed at a vehicle and having respective fields of view exterior of the vehicle. Each of the cameras is operable to capture image data representative of the respective field of view. Captured image data is compressed at the respective camera and the compressed image data is communicated to a control unit. The control unit includes an image processor operable to process image data. The image processor processes image data frame by frame using an indirect context model and without time wise dependency.

16 Claims, 7 Drawing Sheets

(56) References Cited

U.S. PATENT DOCUMENTS

| | | |
|---|---|---|
| 5,341,437 A | 8/1994 | Nakayama |
| 5,355,118 A | 10/1994 | Fukuhara |
| 5,410,346 A | 4/1995 | Saneyoshi et al. |
| 5,414,257 A | 5/1995 | Stanton |
| 5,414,461 A | 5/1995 | Kishi et al. |
| 5,416,318 A | 5/1995 | Hegyi |
| 5,426,294 A | 6/1995 | Kobayashi et al. |
| 5,434,407 A | 7/1995 | Bauer et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,510,983 A | 4/1996 | Iino |
| 5,515,448 A | 5/1996 | Nishitani |
| 5,521,633 A | 5/1996 | Nakajima et al. |
| 5,530,420 A | 6/1996 | Tsuchiya et al. |
| 5,550,677 A | 8/1996 | Schofield et al. |
| 5,666,028 A | 9/1997 | Bechtel et al. |
| 5,670,935 A | 9/1997 | Schofield et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,786,772 A | 7/1998 | Schofield et al. |
| 5,790,403 A | 8/1998 | Nakayama |
| 5,793,420 A | 8/1998 | Schmidt |
| 5,796,094 A | 8/1998 | Schofield et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,497,503 B1 | 12/2002 | Dassanayake et al. |
| 6,539,306 B2 | 3/2003 | Turnbull |
| 6,553,130 B1 | 4/2003 | Lemelson et al. |
| 6,593,960 B1 | 7/2003 | Sugimoto et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,690,268 B2 | 2/2004 | Schofield et al. |
| 6,704,621 B1 | 3/2004 | Stein et al. |
| 6,711,474 B1 | 3/2004 | Treyz et al. |
| 6,735,506 B2 | 5/2004 | Breed et al. |
| 6,744,353 B2 | 6/2004 | Sjönell |
| 6,795,221 B1 | 9/2004 | Urey |
| 6,823,241 B2 | 11/2004 | Shirato et al. |
| 6,824,281 B2 | 11/2004 | Schofield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,027,029 B2 | 9/2011 | Lu et al. |
| 8,849,495 B2 | 9/2014 | Chundrlik, Jr. et al. |
| 2002/0015153 A1 | 2/2002 | Downs |
| 2002/0113873 A1 | 8/2002 | Williams |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Wildmann et al. |
| 2006/0290479 A1 | 12/2006 | Akatsuka et al. |
| 2007/0104476 A1 | 5/2007 | Yasutomi et al. |
| 2008/0231710 A1 | 9/2008 | Asari et al. |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2010/0020170 A1 | 1/2010 | Higgins-Luthman et al. |
| 2010/0228437 A1 | 9/2010 | Hanzawa et al. |
| 2011/0193961 A1* | 8/2011 | Peterson ............ B60R 1/00 348/148 |
| 2012/0044066 A1 | 2/2012 | Mauderer et al. |
| 2012/0062743 A1 | 3/2012 | Lynam et al. |
| 2012/0218412 A1 | 8/2012 | Dellantoni et al. |
| 2012/0262340 A1 | 10/2012 | Hassan et al. |
| 2013/0124052 A1 | 5/2013 | Hahne |

(56) References Cited

U.S. PATENT DOCUMENTS

| | | |
|---|---|---|
| 2013/0129150 A1 | 5/2013 | Saito |
| 2013/0131918 A1 | 5/2013 | Hahne |
| 2014/0067206 A1 | 3/2014 | Pflug |
| 2014/0156157 A1 | 6/2014 | Johnson et al. |
| 2014/0222280 A1 | 8/2014 | Salomonsson |
| 2014/0313339 A1 | 10/2014 | Diessner et al. |
| 2014/0379233 A1 | 12/2014 | Chundrlik, Jr. et al. |
| 2016/0140872 A1* | 5/2016 | Palmer ............... G06K 9/00791 434/65 |

FOREIGN PATENT DOCUMENTS

| | | |
|---|---|---|
| WO | WO2009046268 | 4/2009 |
| WO | WO2010099416 | 9/2010 |
| WO | WO2010144900 | 12/2010 |
| WO | WO2011028686 | 3/2011 |
| WO | WO2012051500 | 4/2012 |
| WO | WO2012075250 | 6/2012 |
| WO | WO2012145822 | 11/2012 |
| WO | WO2013016409 | 1/2013 |
| WO | WO2013019795 | 2/2013 |
| WO | WO2013043661 | 3/2013 |
| WO | WO2013081984 | 6/2013 |
| WO | WO2013081985 | 6/2013 |
| WO | WO2013086249 | 6/2013 |
| WO | WO2013109869 | 7/2013 |

OTHER PUBLICATIONS

Matt Mahoney, "Data Compression Explained", Dell Corp., Apr. 15, 2013 (Year: 2013).*

* cited by examiner

FIG. 1

| [context] Index | Vector table | | Auxiliary table | | | |
|---|---|---|---|---|---|---|
| | Verctor low | Verctor high | Sum vector low | Sum vector low | Event counter low | Event counter high |
| 0 | | | | | | |
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |
| 13 | | | | | | |
| 14 | | | | | | |
| ... | | | | | | |
| 256 | | | | | | |

FIG. 2

| column<br>line | 0 | 1 | 2 | 3 | 4 | 5 | 6 | 5 | 6 | 7 | 8 | 8 | 9 | ... | 1023 | 1024 |
|---|---|---|---|---|---|---|---|---|---|---|---|---|---|---|---|---|
| 0 | x | | x | | x | | x | | x | | x | | x | | x | |
| 1 | x | | x | | x | | x | | x | | x | | x | | x | |
| 2 | x | | x | | x | | x | | x | | x | | x | | x | |
| 3 | x | | x | | C | | C | | x | | x | | x | | x | |
| 4 | x | | C | | C | | C | | C | | x | | x | | x | |
| 5 | x | | C | | C | | P | | . | | . | | . | | . | |
| 6 | . | | . | | . | | . | | . | | . | | . | | . | |
| 7 | . | | . | | . | | . | | . | | . | | . | | . | |
| 8 | . | | . | | . | | . | | . | | . | | . | | . | |
| 9 | . | | . | | . | | . | | . | | . | | . | | . | |
| 10 | . | | . | | . | | . | | . | | . | | . | | . | |
| 11 | . | | . | | . | | . | | . | | . | | . | | . | |
| 12 | . | | . | | . | | . | | . | | . | | . | | . | |
| 13 | . | | . | | . | | . | | . | | . | | . | | . | |
| 14 | . | | . | | . | | . | | . | | . | | . | | . | |
| ... | | | | | | | | | | | | | | | . | |
| 768 | . | | . | | . | | . | | . | | . | | . | | . | |

Legend:
P      Block (of two pixel) position under test
x      already decision coded bits
.      unknown code bits
C      already decision coded bits serving as context bits
☐      Block area the decision is ongoing for

FIG. 3

Legend:
P           Block (of two pixel) position under test
x           don't care, done
.           don't care, undone
F           Pixel (-1,-1) relative to P
G           Pixel (0,-1) relative to P
H           Pixel (+1,-1) relative to P
☐           Block area the decision is ongoing for predicted value:    p $p = F * 1/4 + G * 1/2 + H * 1/4$

FIG. 4

| column / line | 0 | 1 | 2 | 3 | 4 | 5 | 6 | 5 | 6 | 7 | 8 | 8 | 9 | ... | 1024 |
|---|---|---|---|---|---|---|---|---|---|---|---|---|---|---|---|
| 0 | x | x | x | x | x | x | x | x | x | x | x | x | x |  | x |
| 1 | x | x | x | x | x | x | x | x | x | x | x | x | x |  | x |
| 2 | x | x | x | x | x | x | x | x | x | x | x | x | x |  | x |
| 3 | x | x | x | x | x | x | x | x | x | x | x | x | x |  | x |
| 4 | x | x | x | x | x | x | x | H | x | x | x | x | x |  | x |
| 5 | x | x | x | x | x | K | P | . | . | . | . | . | . |  | . |
| 6 | . | . | . | . | . | . | . | . | . | . | . | . | . |  | . |
| 7 | . | . | . | . | . | . | . | . | . | . | . | . | . |  | . |
| 8 | . | . | . | . | . | . | . | . | . | . | . | . | . |  | . |
| 9 | . | . | . | . | . | . | . | . | . | . | . | . | . |  | . |
| 10 | . | . | . | . | . | . | . | . | . | . | . | . | . |  | . |
| 11 | . | . | . | . | . | . | . | . | . | . | . | . | . |  | . |
| 12 | . | . | . | . | . | . | . | . | . | . | . | . | . |  | . |
| 13 | . | . | . | . | . | . | . | . | . | . | . | . | . |  | . |
| 14 | . | . | . | . | . | . | . | . | . | . | . | . | . |  | . |
| ... |  |  |  |  |  |  |  |  |  |  |  |  |  |  | . |
| 768 | . | . | . | . | . | . | . | . | . | . | . | . | . |  | . |

Legend:
P       Block (of two pixel) position under test
x       don't care, done
.       don't care, undone
H       Pixel (+1,-1) relative to P
K       Pixel (-1,0) relative to P
☐       Block area the decision is ongoing for predicted value:    p $$p = H * {}^{148}/_{256} + K * {}^{112}/_{256}$$

VEHICLE VISION SYSTEM WITH VIDEO COMPRESSION

CROSS REFERENCE TO RELATED APPLICATION

The present application claims the filing benefits of U.S. provisional application Ser. No. 62/136,675, filed Mar. 23, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known.

Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides a lossy video compression (and decompression) codec based on vector quantization using an indirect context model.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
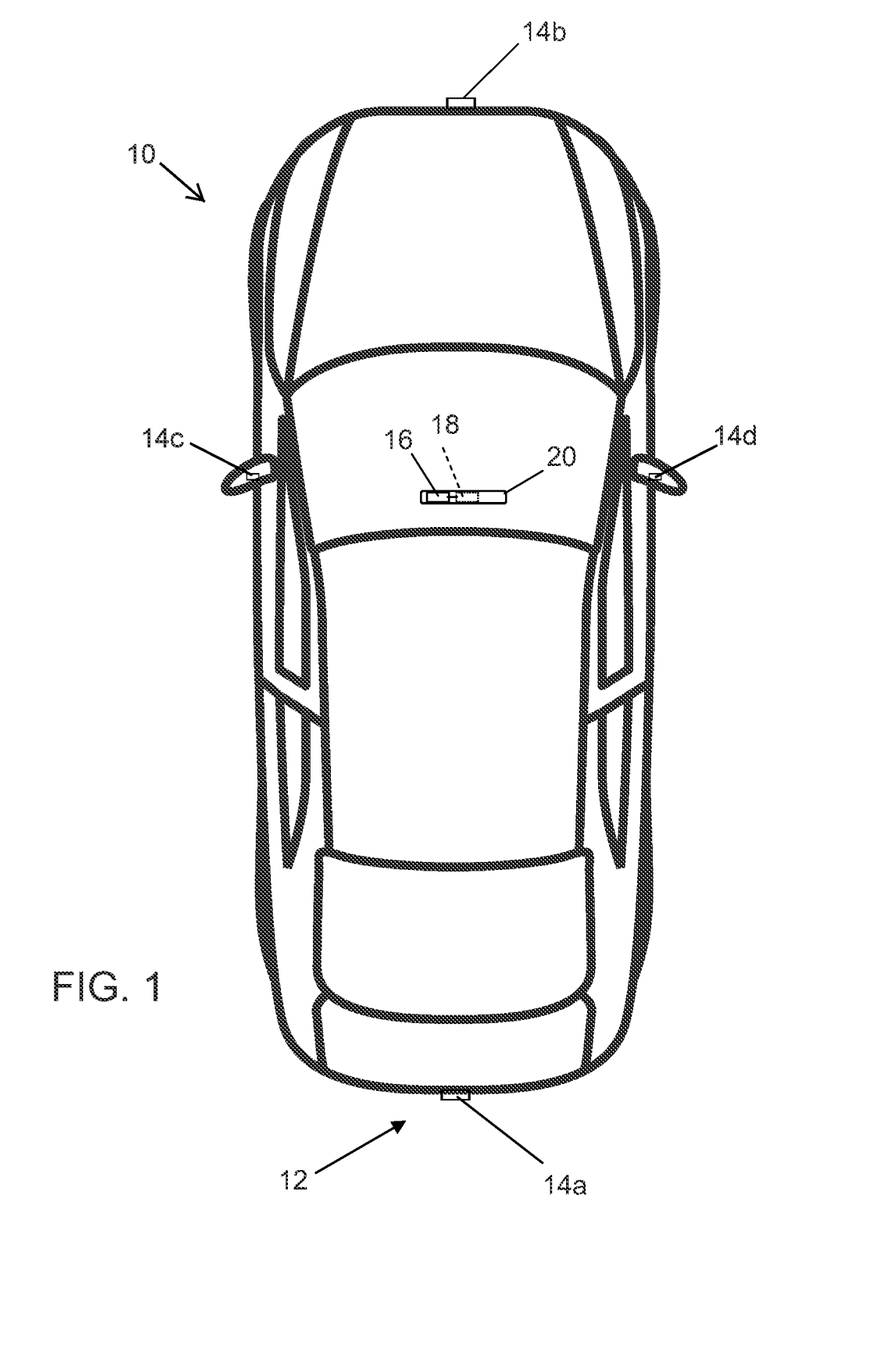
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle. Optionally, compressed image data may be communicated to the ECU via a wireless communication link or Ethernet communication or the like. The ECU may process captured image data or compressed image data or decompressed image data for display or for machine vision (such as object detection or the like) or for autonomous vehicle control.

The present invention provides a lossy video compression (and decompression) codec based on vector quantization using an indirect context model (see Matt Mahoney "Data Compression Explained" 4.1.3, mattmahoney.net/dc/dce.html, Section 413). No discrete wavelet transform (DWT) or discrete cosine transform (DCT) is required.

Videos or captured video data may be compressed frame by frame without time wise dependencies. By that a decompression may start at any frame. Two dimensional (2D) images may have an arbitrary, constant size. The compression rate depends on the chosen vector length and the color space. By that compression in gray level may have the rate of 1:8 or 1:16 or the like. The color room choice adds compression capabilities, such as YUV9: X 2.67, YUYV: X 2.0. For example, with a vector length of 1 a gray level image may have compression of 1:8, a same size YUYV image can be packed to 1:16, when using IYUV, a package ratio of 1:21.33 can be achieved.

The required data channel bandwidth is constant. The suggested codec or device or program for encoding/decoding a digital data stream is extremely slim compared to known common lossy codecs such as MPEG, though the performance is about comparable to MPEG2. Both the compression (encoding) and decompression (decoding) routines are symmetric and extremely lean on resource demand. The coding-caused artifacts are comparably different: No block artifacts occur, but mosquito noise and ringing. On high package rates, such as for example 1:426 and higher, the suggested codec is superior MPEG2 in image reconstruction quality. The posterization is much lower compared to MPEG2. Color edges begin to frazzle out longitudinal instead.

For simplification, the below description is done for coding a black and white image frame. When coding color images, the color channels may be coded in sequence, for example, when coding an IMC2 format frame the Y which comes in full resolution may be coded first, then the U channel which comes in half resolution, then the V channel which comes also in half resolution.

When compressing a frame (or channel when using colored images), the image bits of that frame may be coded in sequence of its order starting from the upper left corner consecutively the first row and then continuing with the following rows from left to right and from the top to the bottom.

Figure 2:
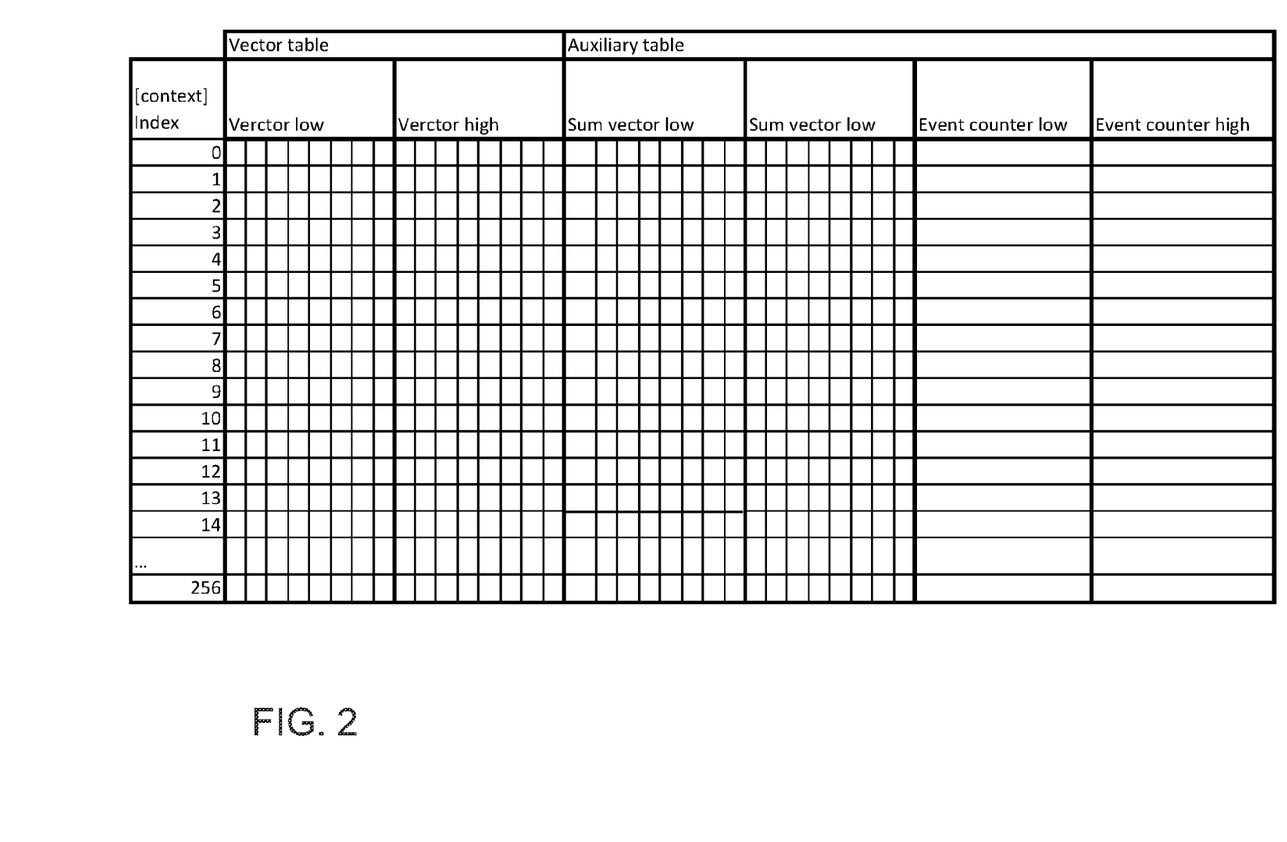
FIG. 2 is a vector table with vectors of the lengths 8 and 8 context bits.

For code execution (of the encoder), a vector table (or codebook) and a decision or context bit field is required. At the start, the codebook may be initialized with all elements equal to 1 for the high vector and −1 for the low. The codebook adaption may last just a few frames (such as four frames or thereabouts), before finding a mostly optimal setting. Each table index (i) has duplet of vectors, with a 'higher' vector ($vh_i$) and a 'lower' vector ($vl_i$). Each of these vectors has an according event counter (high counter $hc_i$ and low counter $lc_i$) and a sum vector table ($sh_i$, $sl_i$) additionally. An example with a vector table with vectors of the lengths 8 and 8 context bits is shown in FIG. 2.

Figure 3:
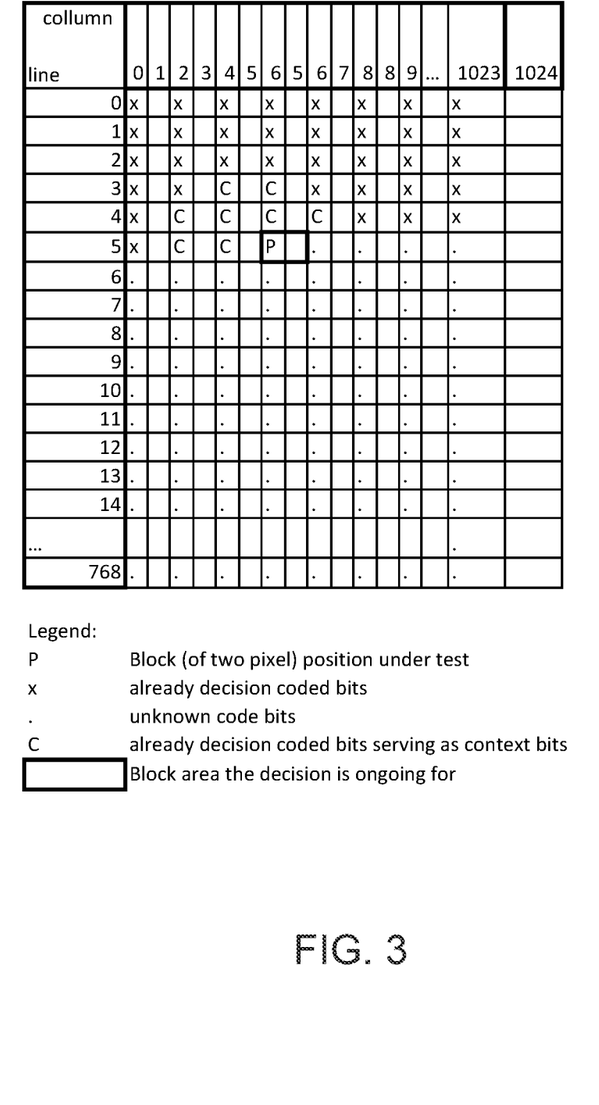
FIG. 3 is a table showing pixel positions and decision process of the pixels.

A pixel ($A_{n,m}$) (position row n, column m) or sequence ($A_{n,m}$, $B_{n,m}$, $C_{n,m}$, ...) of consecutive pixels (a block (length n>1)) may be coded as a decision bit ($x(A_{n,m})$, $x(B_{n,m})$, $x(C_{n,m})$ ...) by deciding the choice of one of the vector duplet indexed by the context which are both added to a predicted value (p) (the results or errors may be called el and eh). The vector elements may be handled as when pointing into a space of the dimension of vector elements (as the higher the package rate the more elements the vectors may have) and the vectors may be compared by the set of Pythagoras. The squared values of the error 'el' and 'eh' may be compared and the value of the one which is closer to the source pixel's under test square value may be coded (transmit via a data line or channel) and entered in the bit field at the according source pixel's position.

p=predicted Pixel c=context index $el=$(original source pixel$-(p+vli[c]))^2$;

$eh=$(original source pixel$-(p+vh_{i[c]}))^2$; Formula 1:

The context is based on the context of prior decision bits surrounding the pixel $A_{n-s,m-z}$ or block position under test. The surrounding context may be acquired, preferably in relatively near, by that maybe a line above (z=0 ... 1) and/or one, two or three pixels left (z=1 ... 3) from the pixel under test (P), see FIG. 3. In the example of FIG. 3, eight context decision bits may be acquired. In this example a block may context two (gray level) pixels, by that at each second pixel a decision is to be made. The already done decisions are indicated with 'x' in FIG. 3 and '.' indicates the undone decisions. The block under test with the starting position '$P_{m,n}$' may be in the line 5 (m=5) the seventh pixel (n=6). The context (c) bits C are collected from position [$P_{-1,0}$, $P_{-2,0}$, $P_{+1,-1}$, $P_{0,-1}$, $P_{-1,-1}$, $P_{-2,-1}$, $P_{-0,-2}$, $P_{-1,-2}$].

Figure 4:
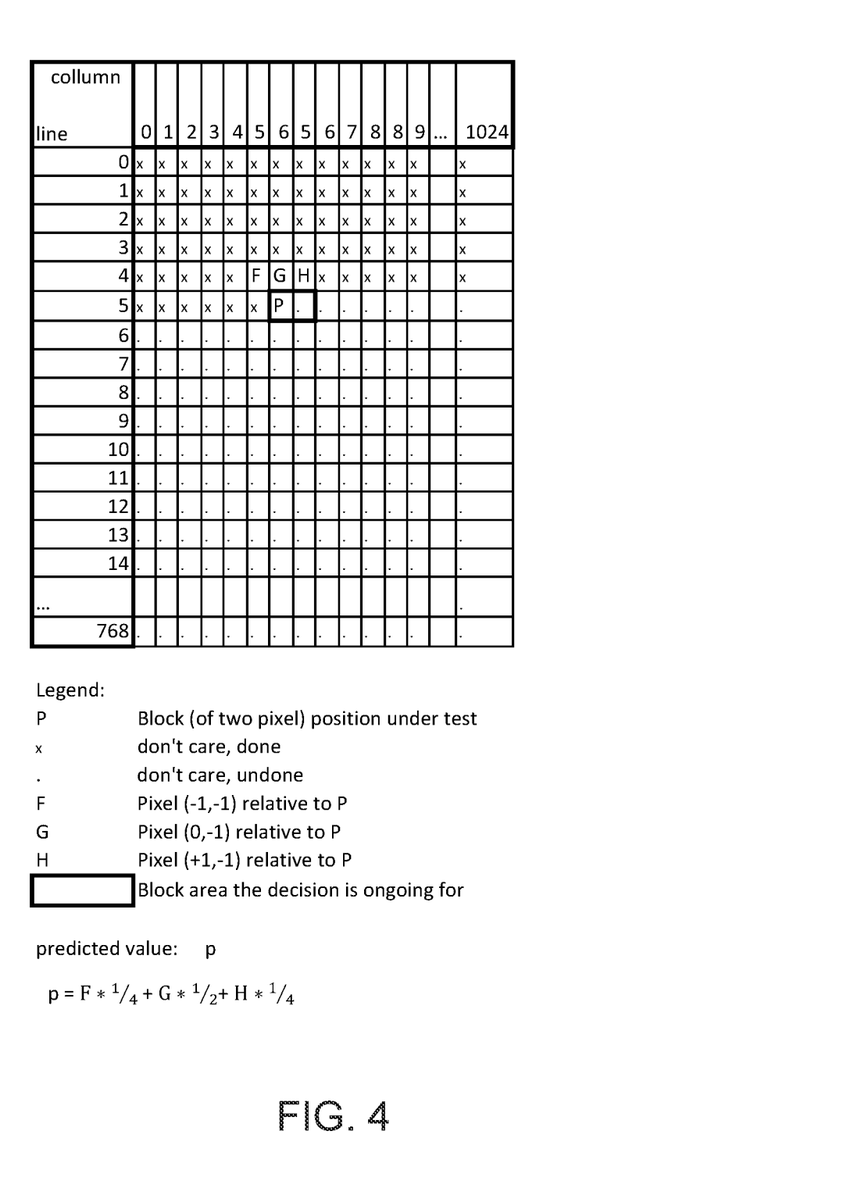
FIG. 4 is a table showing pixel positions and a linear decision process of the pixels.
Figure 5:
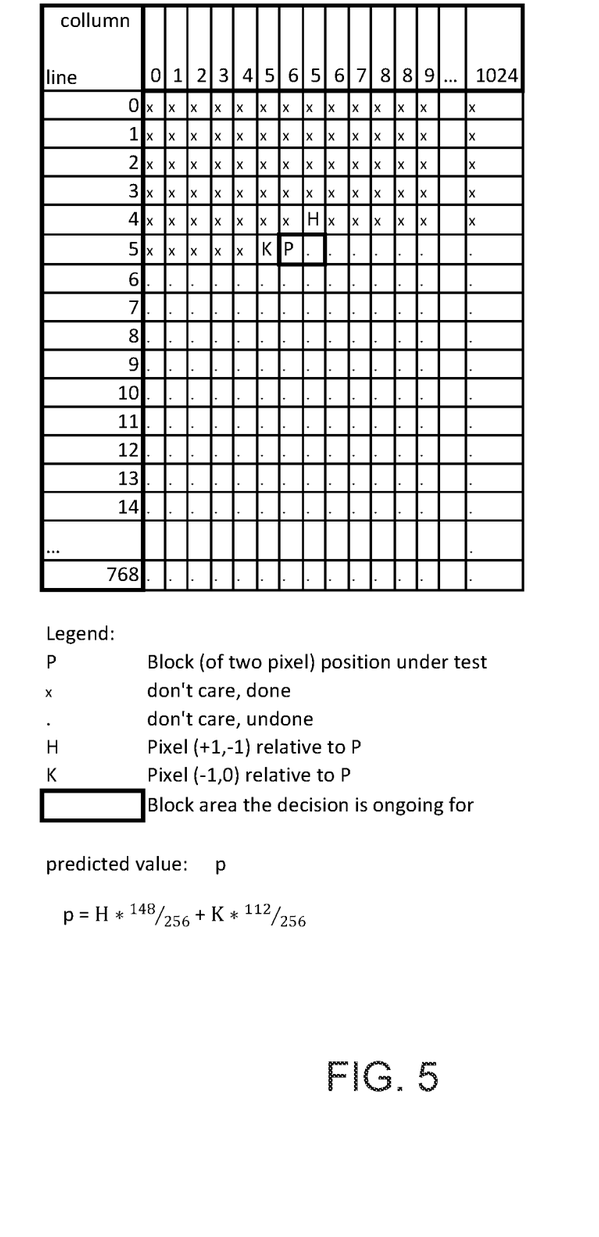
FIG. 5 is a table showing pixel positions and a process that uses arbitrary weighting of the blend of input pixels.

The predicted value (p) may be generated by averaging any number, preferably a low number (such as two), of the pixel or block under test surrounding (known) pixels. The surrounding pixel chosen as input for the prediction may or may not correlate with pixel positions chosen for the context generation. Optionally, a linear average may be generated. Optionally, a Gauss average may be used such as shown in FIG. 4 and Formula 2. In there the pixel above may be taken by the half as predicted value plus a quarter of the pixel one above, one left and another quarter of the pixel above right. Optionally, an arbitrary weighting of the blend of input pixels may be chosen such as shown in FIG. 5 and Formula 3. In there the pixel above right is merged with a weight of 148/256 during the pixel left is blend with the weight of 112/256.

$p=F*¼+G*½+H*¼$ Formula 2:

$p=H*148/256+K*112/256$ Formula 3:

After a full frame (or many frames) is/are coded, the vector table becomes updated.

Figure 6:
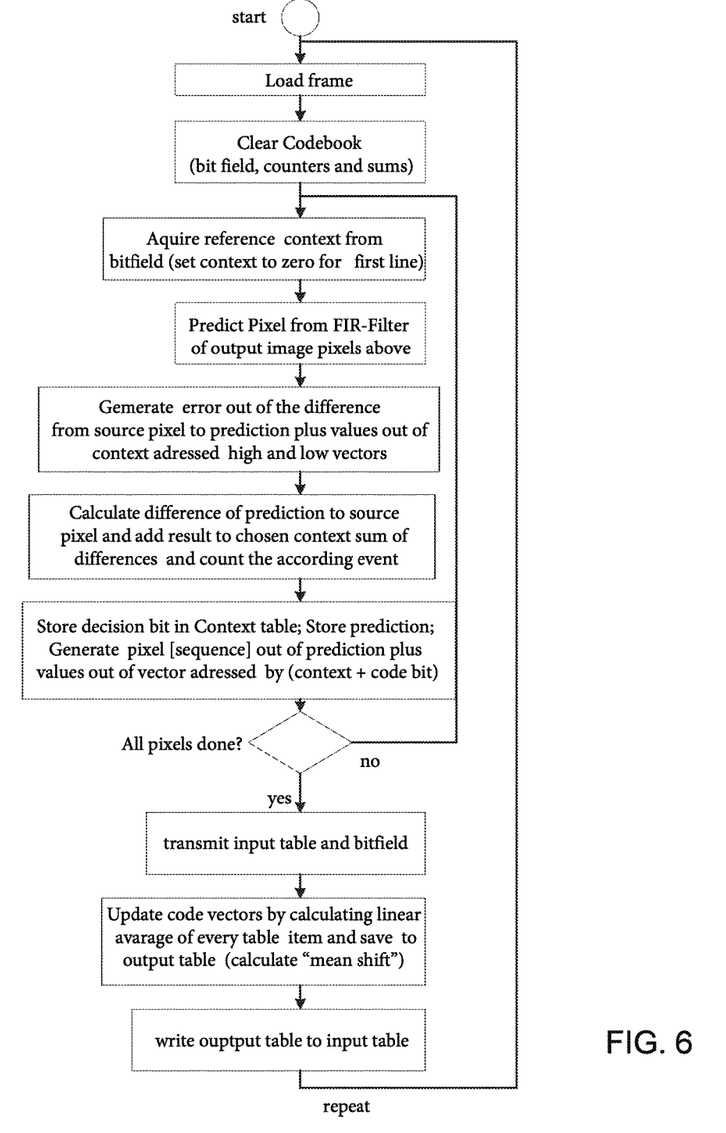
FIG. 6 is a flow chart of an encoding routine of the present invention.

The sum vector table elements are divided by the according counter element. The corresponding vector is overwritten (replaced) by that result. When the update is done, the vector table may be transmitted. That may happen after each frame or optionally less often decided by a heuristic. A flow chart of the above described encoding routine is shown in FIG. 6. As shown in FIG. 6, the system starts by loading a frame of captured image data and clearing the bit field, counters and sums, and acquiring a reference context from the bit field. They system predicts a pixel from a far infrared (FIR) filter of the output image pixels and generates an error from the difference between the source pixel and the prediction. The system calculates the difference between the prediction and the source pixel and adds the result to a selected context sum of differences. The system stores the decision bit in a context table, stores the prediction and generates a pixel sequence out of the prediction plus values out of the vector. This is repeated until all pixels are processed. Then the system transmits the input table and bit field and updates the code vectors by calculating a linear average of every table item and saving that to an output table, whereby the output table is written to the input table. The process is then repeated with the next frame that is loaded.

Figure 7:
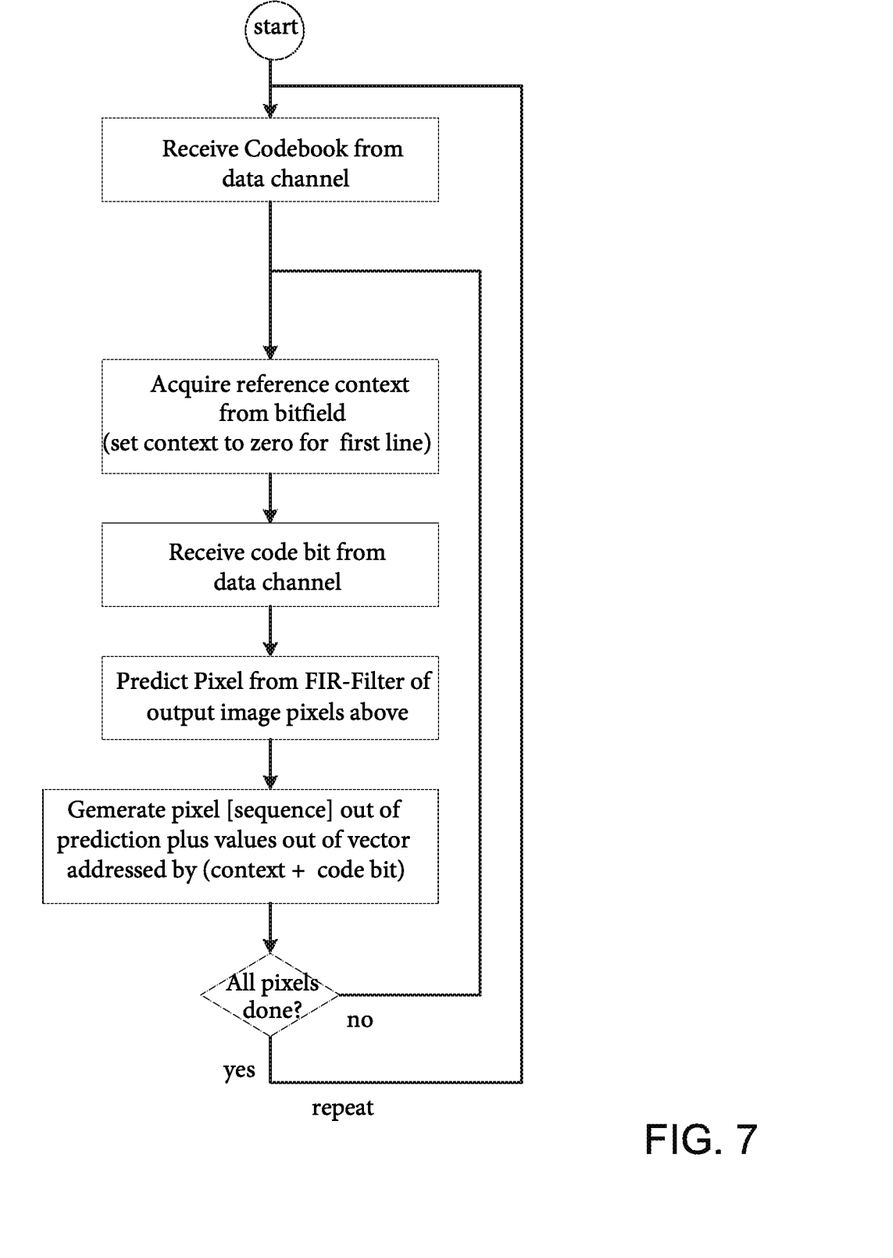
FIG. 7 is a flow chart of a decoding routine of the present invention.

A flow chart of the decoding routine is shown in FIG. 7. As shown in FIG. 7, the system receives the codebook from the data channel, and acquires reference context from bit field, and receives code bit from the data channel. The system predicts the pixel output from the FIR filter of the output image pixels, and generates a pixel (sequence) out of the prediction plus values out of the vector addressed by the sum of the context and code bit. The system repeats processing until all pixels of a captured frame of image data are processed, and then repeats processing of pixels of the next captured frame of image data. It becomes apparent that the decoding routine is comparably simpler than the encoding routine. The mechanisms of predicting a pixel value out of the direct neighborhood of a to-be-generated pixel is substantially similar or identical to the encoder. The context generation is substantially similar or identical. The vector table has no counters and sums but only the high and low vectors. Both vectors are still indexed by the context value. The code bit coming from the data transmission channel addresses the high or the low vector. The vector content plus the predicted pixel value is then written to the generated output image.

The above described codec is optimized on the generated load put on the coding device. This device may be a microprocessor, a graphic processing unit (GPU), a field programmable gate array (FPGA), a digital signal processor (DSP) or other logical unit.

When optimizing to the best image reproduction quality, optionally one frame may be coded more than once and by that the vector table is adapted to that frame before transmission.

Optionally, the vector table may be updated more than once per frame, such as, for example, after each coded pixel or after each line or after each raise of a vector counter.

Optionally, the counter and sum vector tables may not be nulled after each vector table update but the updated values blend to the old values in the vector table (such as, for example, by low pass filtering or sliding average).

Optionally, the codebook may be initialized with well-trained data, generally well for the chosen application or use, on start instead of randomly initialized. In vehicle camera video data streams may be initialized different, than movies played from a blue ray disc. Other differences may occur when transferring the display content artificially rendered or animated or text only, such as the content of an e-book or the like.

When optimizing to the least required channel load instead, optionally the vector table may be initialized only once and not transmitted or seldom repeatedly transmitted, as decided by a heuristic.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. Pat. Nos. 8,542,451; 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176;

6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 6,690,268 and/or 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/145822; WO 2013/081985; WO 2013/086249 and/or WO 2013/109869, and/or U.S. Pat. No. 9,264,672, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A multi-camera vision system of a vehicle, said multi-camera vision system comprising:

at least four cameras disposed at a vehicle and having respective fields of view exterior of the vehicle;

wherein said at least four cameras comprises (i) at least one forward viewing camera having a field of view forward of the vehicle, (ii) at least one rearward viewing camera having a field of view rearward of the vehicle, (iii) at least one driver-side side viewing camera having a field of view sideward of the vehicle at the driver-side of the vehicle, and (iv) at least one passenger-side side viewing camera having a field of view sideward of the vehicle at the passenger-side of the vehicle;

wherein each of said cameras comprises a pixelated imaging array having a plurality of photosensing elements;

wherein each of said cameras is operable to capture image data within the respective field of view;

wherein captured image data is compressed at the respective camera and wherein the compressed image data is communicated to a control unit;

wherein said control unit comprises an image processor;

wherein said image processor processes image data frame by frame using an indirect context model and without time wise dependency;

wherein compressed image data is received at said control unit and decompressed before processing of image data by said image processor;

wherein captured image data is compressed via a lossy video data compression and compressed image data is decompressed at said control unit via a decompression codec based on vector quantization using said indirect context model to select from available vectors; and wherein captured image data is compressed at a compression rate that depends on a selected vector length and color space.

2. The multi-camera vision system of claim 1, wherein, after a full frame is coded, a vector table becomes updated.

3. The multi-camera vision system of claim 2, wherein a sum of vector table elements is divided by a counter element.

4. The multi-camera vision system of claim 1, wherein a pixel or sequence of consecutive pixels are coded as a decision bit by deciding a vector duplet indexed by a context.

5. The multi-camera vision system of claim 4, wherein the vector duplet indexed by the context is added to a predicted value of the pixel or sequence of consecutive pixels to determine an error.

6. The multi-camera vision system of claim 5, wherein the error is coded and entered in a bit field for the according source pixel's position.

7. The multi-camera vision system of claim 1, wherein a context is based on the context of prior decision bits surrounding a pixel.

8. The multi-camera vision system of claim 1, wherein a data channel bandwidth for captured image data is constant.

9. The multi-camera vision system of claim 1, wherein compressed image data is communicated to said control unit via an Ethernet communication.

10. The multi-camera vision system of claim 1, wherein a pixel is processed by the context model based on at least one other pixel adjacent to the pixel being processed.

11. A multi-camera vision system of a vehicle, said multi-camera vision system comprising:
- at least four cameras disposed at a vehicle and having respective fields of view exterior of the vehicle;
- wherein said at least four cameras comprises (i) at least one forward viewing camera having a field of view forward of the vehicle, (ii) at least one rearward viewing camera having a field of view rearward of the vehicle, (iii) at least one driver-side side viewing camera having a field of view sideward of the vehicle at the driver-side of the vehicle, and (iv) at least one passenger-side side viewing camera having a field of view sideward of the vehicle at the passenger-side of the vehicle;
- wherein each of said cameras comprises a pixelated imaging array having a plurality of photosensing elements;
- wherein each of said cameras is operable to capture image data within the respective field of view;
- wherein captured image data is compressed at the respective camera and wherein the compressed image data is communicated to a control unit;
- wherein compressed image data is communicated to said control unit via an Ethernet communication;
- wherein said control unit comprises an image processor;
- wherein compressed image data is received at said control unit and decompressed before processing of image data by said image processor;
- wherein said image processor processes image data frame by frame using an indirect context model and without time wise dependency; and
- wherein captured image data is compressed via a lossy video data compression and compressed image data is decompressed at said control unit via a decompression codec based on vector quantization using said indirect context model to select from available vectors.

12. The multi-camera vision system of claim 11, wherein captured image data is compressed at a compression rate that depends on a selected vector length and color space, and wherein, after a full frame is coded, a vector table becomes updated.

13. The multi-camera vision system of claim 11, wherein a pixel or sequence of consecutive pixels are coded as a decision bit by deciding a vector duplet indexed by a context, and wherein the vector duplet indexed by the context is added to a predicted value of the pixel or sequence of consecutive pixels to determine an error, and wherein the error is coded and entered in a bit field for the according source pixel's position.

14. The multi-camera vision system of claim 11, wherein a pixel is processed by the context model based on at least one other pixel adjacent to the pixel being processed.

15. A multi-camera vision system of a vehicle, said multi-camera vision system comprising:
- at least four cameras disposed at a vehicle and having respective fields of view exterior of the vehicle;
- wherein said at least four cameras comprises (i) at least one forward viewing camera having a field of view forward of the vehicle, (ii) at least one rearward viewing camera having a field of view rearward of the vehicle, (iii) at least one driver-side side viewing camera having a field of view sideward of the vehicle at the driver-side of the vehicle, and (iv) at least one passenger-side side viewing camera having a field of view sideward of the vehicle at the passenger-side of the vehicle;
- wherein each of said cameras comprises a pixelated imaging array having a plurality of photosensing elements;
- wherein each of said cameras is operable to capture image data within the respective field of view;
- wherein captured image data is compressed at the respective camera and wherein the compressed image data is communicated to a control unit;
- wherein said control unit comprises an image processor;
- wherein compressed image data is received at said control unit and decompressed before processing of image data by said image processor;
- wherein said image processor processes image data frame by frame using an indirect context model and without time wise dependency;
- wherein a pixel or sequence of consecutive pixels are coded as a decision bit by deciding a vector duplet indexed by a context; and
- wherein captured image data is compressed via a lossy video data compression and compressed image data is decompressed at said control unit via a decompression codec based on vector quantization using said indirect context model to select from available vectors, and wherein captured image data is compressed at a compression rate that depends on a selected vector length and color space.

16. The multi-camera vision system of claim 15, wherein, after a full frame is coded, a vector table becomes updated, and wherein the vector duplet indexed by the context is added to a predicted value of the pixel or sequence of consecutive pixels to determine an error, and wherein the error is coded and entered in a bit field for the according source pixel's position.

* * * * *